Patented Oct. 27, 1953

2,657,242

UNITED STATES PATENT OFFICE 2,657,242

PROCESS OF MAKING BUTANE-1,2,4-TRIOL

Sidney Siggia, Easton, Pa., assignor to General Aniline & Film Corporation, New York, N. Y., a corporation of Delaware No Drawing. Application July 20, 1949, Serial No. 105,891

3 Claims. (Cl. 260—635)

This invention relates to an improved process for the manufacture of butane-1,2,4-triol.

Butane-1,2,4-triol has been produced in Germany by several methods but in its production a number of by-products or impurities are also formed. These impurities are not easily separable and it has been found that a product of high purity was not obtainable by the prior processes. In some possible uses of the compound, such as for the manufacture of explosives, purity is of great importance so that a process which would yield a pure product is very desirable.

It is therefore an object of the present invention to provide an improved process for the manufacture of butane-1,2,4-triol.

It is a further object of the present invention to provide a process for the manufacture of substantially pure butane-1,2,4-triol.

These and other objects of the present invention are attained by my improved process which comprises the hydration of but-2-yne-1,4-diol to butane-1,4-diol-2-one followed by hydrogenation of this compound to impure butane-1,2,4-triol followed by extraction with ether. The reaction may be represented by the following equation:

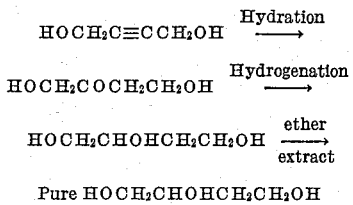

Pure HOCH₂CHOHCH₂CH₂OH

The following example illustrates a preferred method of carrying out the invention but it will be understood that the invention is not limited thereto and substitution and variations may be made within the scope of the claims:

Example 500 parts of a 33% aqueous solution of but-2-yne-diol-1,4 was mixed at 40° C. with 10 parts concentrated sulphuric acid and 3 parts mercuric sulphate were added with stirring. The reaction is exothermic. It was kept for about an hour at 80–90° C. and then allowed to cool with stirring for several hours. It was then warmed again to 40° C., a further 3 parts mercuric sulphate added and the mixture allowed to cool with stirring. The aqueous solution of butane-1,4-diol-2-one was neutralized by the addition of sodium carbonate and the precipitated mercury compound filtered off. It was again filtered through activated carbon. A copper catalyst containing 6.5% chromium on silica gel was added, the mixture heated to 80–100° C. in a pressure vessel and hydrogen introduced at a pressure of 200 atmospheres. When the bulk of the hydrogen was absorbed the mixture was heated to 140° C. to complete the reaction. It was allowed to cool and the water distilled off. The product was shaken with three successive portions (⅕ the volume of the triol) of diethyl ether and the ether decanted from the syrupy product. The product was distilled under reduced pressure (0.5 mm.). The fraction corresponding to the butane-1,2,4-triol had a purity of 99.7%.

While the number of ether extracts may be varied, from three to five is usually sufficient. The amount of ether may also be varied, but minimum amounts in the range of 10 to 30% are preferable.

The procedure for the purification of butane triol may be altered on different samples of the crude product. While the ether extraction alone may be the only necessary purification step, it is sometimes desirable to use distillation either before or after the ether extraction. Preferably, the material is first ether extracted and then distilled if both steps are used. The butane triol distills at 125° C./0.2 mm. or 135° C./1.2 mm.

The desirability for distillation occurs when the butane triol has as impurities 1,2-glycol type materials which are not always present. There are, however, other types of impurities which are usually present and are not removable by distillation.

An attempt was made to identify impurities removed by the ether by concentrating the ether extract and making an infra-red study of the impurity. It was different from butane-1,2,4-triol and contained a C=O group. It was also shown that substantially no butane-1,2,4-triol was dissolved in the diethyl ether which is important since no product is thereby lost.

An unexpected feature of the final purification step is that ethers other than diethyl ether and other organic liquids boiling in the same general temperature range, such as chlorobenzone and chloroform were not satisfactory.

A study of prior art processes showed a purity of 95.3–95.6% for the butane-1,2,4-triol and the present process gave a purity in the range 99.2–99.5%.

What I claim is:

1. A process for the manufacture of substantially pure butane-1,2,4-triol which comprises hydrating but-2-yne-1,4-diol to butane-1,4-diol- 2-one in the presence of mercuric sulfate at a temperature in the range of 40° to 90° C., catalytically hydrogenating the resulting mixture under elevated temperature and pressure to form a mixture containing butane-1,2,4-triol, extracting the latter mixture with diethyl ether, and recovering substantially pure butane-1,2,4-triol from the raffinate.

2. A process of claim 1 wherein the ether extract is separated by decanting.

3. A process of claim 1 wherein the substantially pure product is recovered from the raffinate by distilling under reduced pressure.

SIDNEY SIGGIA.

References Cited in the file of this patent

UNITED STATES PATENTS

| Number | Name | Date |
|---|---|---|
| 1,147,769 | Laszloffy | July 27, 1915 |
| 1,899,156 | Kluyver et al. | Feb. 28, 1933 |
| 2,079,403 | Hansley | May 4, 1937 |
| 2,154,930 | Evans | Apr. 18, 1939 |
| 2,243,701 | Halbig et al. | May 27, 1941 |

FOREIGN PATENTS

| Number | Country | Date |
|---|---|---|
| 449,639 | Belgium | Mar. 13, 1943 |
| 449,948 | Belgium | Mar. 30, 1943 |

OTHER REFERENCES

Johnson, "Acetylenic Compounds," vol. 1, pages 198 and 199, published by Edward Arnold and Co., London, 1946.

Modern Plastics, vol. 23, No. 6 (February 1946), pages 173 and 174.

Modern Plastics, vol. 23, No. 6, pages 169–176, 218, 220 (1946).